United States Patent [19]
Tsunetomo et al.

[11] Patent Number: 5,910,256
[45] Date of Patent: Jun. 8, 1999

[54] METHOD FOR MANUFACTURING A DIFFRACTION TYPE OPTICAL ELEMENT

[75] Inventors: Keiji Tsunetomo; Tadashi Koyama, both of Osaka, Japan

[73] Assignee: Nippon Sheet Glass Co., Ltd., Osaka, Japan

[21] Appl. No.: 08/910,365

[22] Filed: Aug. 13, 1997

[30] Foreign Application Priority Data

Aug. 27, 1996 [JP] Japan .................................... 8-224936

[51] Int. Cl.$^6$ ....................................................... B44C 1/22
[52] U.S. Cl. ................................ 216/24; 216/11; 216/65; 216/80
[58] Field of Search ................................. 216/11, 24, 65, 216/80, 85

[56] References Cited

U.S. PATENT DOCUMENTS

| | | |
|---|---|---|
| 4,125,405 | 11/1978 | Araujo et al. . |
| 4,296,479 | 10/1981 | Wu . |
| 4,405,405 | 9/1983 | Fujii et al. ............................ 216/24 X |
| 5,004,673 | 4/1991 | Vlannes ................................ 216/24 X |
| 5,053,171 | 10/1991 | Portney et al. . |
| 5,078,771 | 1/1992 | Wu . |
| 5,145,757 | 9/1992 | Smoot et al. . |

FOREIGN PATENT DOCUMENTS

| | | |
|---|---|---|
| 079473 | 5/1983 | European Pat. Off. . |
| 690028 | 1/1996 | European Pat. Off. . |
| 40 25 814 | 11/1991 | Germany . |
| WO 96/27815 | 9/1996 | WIPO . |

OTHER PUBLICATIONS

Bahr, J. et al., "Index–distributed planar microlenses for three–dimensional micro–optics fabricated by silver–sodium ion exchange in BGG35 substrates", Applied Optics, vol. 33, No. 25, Sep. 1, 1994, pp. 5919–5924.

Amosov, A.V. et al., "The Behavior of Synthetic Silica Glass upon Exposure to High–Power KrF and ArF Laser Radiation", Glass Physics And Chemistry, vol. 20, No. 1, Jan. 1, 1994, pp. 67–72.

Mukhina, L. L. et al., "Laser Pulse Damage on the Surface of Ion Exchange Treated Glass", Glass Physics And Chemistry, vol. 19, No. 3, Jun. 1, 1993, pp. 269–272.

Sprechaal, "Product News", Journal Of Aircraft, vol. 121, No. 9, 1988, pp. 708, 710, 712, 714.

Chludzinski, P. et al., "Ion exchange between soda–lime–silica glass and sodium nitrate—silver nitrate molten salts", Physics And Chemistry Of Glasses, vol. 28, No. 5, Oct. 1987, pp. 169–173.

Primary Examiner—William Powell
Attorney, Agent, or Firm—Merchant, Gould, Smith, Edell, Welter & Schmidt, P. A.

[57] ABSTRACT

In a method for manufacturing a diffraction type optical element having an arbitrary cross-section, a laser beam of a single mode is divided into two and then is again focused on a thin film on a substrate, thereby obtaining a laser beam pattern changing periodically in intensity through interference thereof which is then irradiated onto the substrate while the substrate is positioned inclined with respect to a plane which is perpendicular to an average light beam axis of the two laser beams.

6 Claims, 5 Drawing Sheets

METHOD FOR MANUFACTURING A DIFFRACTION TYPE OPTICAL ELEMENT

BACKGROUND OF THE INVENTION

1. Field of the Invention

The present invention relates to a method for manufacturing a diffraction type optical element for selectively dividing and diffracting spectral light into a specific direction, or having asymmetric convexities in the cross-section thereof.

2. Description of the Related Art

As a diffraction type optical element, there are known various optical elements, such as a diffraction grating, a hologram or a photonic crystal, etc. These elements are installed for instance in a photo-coupler, a polariscope, a wave divider, a wave-length filter, a reflector, a mirror of high efficiency wave-guide type, a double reflection (birefringence) element, a light scattering body, or a mode converter, etc.

These optical elements, such as the diffraction grating and so on, are fundamental optical parts which are widely used in various fields of optical technology, including optical measurement and optical communication. An optical element of the diffraction type which is commercially available is generally manufactured by the so-called stamper method or by a coherent exposure method.

In the stamper method, the diffraction type optical element is formed by a process in which an organic material is injected into a mold of an original and is transcribed onto a substrate.

On the other hand, in the coherent exposure method, there is already known a method, in which an organic light sensitive material pasted on the surface of a substrate is exposed to coherent light by irradiating light onto both sides of the film surface of the pasted light sensitive organic material and the substrate surface, thereby controlling the configuration of a cross-section of the diffraction grating. Additionally, there is also a method in which two light beams are irradiated upon the film surface at different incident angles respectively ("Optical Integrated Circuit", under the joint authorship of Hiroshi Nishihara, Masamitsu Haruna, Toshiaki Sakakibara, Ohm Co., 1985, Chapter 7).

However, the element, on the surface of which is evaporated a high reflection material such as a metal, is sometimes used when it is in the process of being applied.

Also, since a glass material has superior characteristics with respect to flatness, processing accuracy, weather resistance, etc., there is already known a diffraction grating for use in the field of optical communication, which is formed directly on the surface of the glass substrate by a micro processing.

In treating such micro processing on the glass substrate, conventionally there is known a wet etching (chemical etching) method using an etchant including hydrofluoric acid, etc., or a dry etching (physical etching) method including, for example reactive ion etching.

For some time, for instance, for selectively dividing and diffracting spectral light into a specific direction, a diffraction grating having a configuration which is continuous from a symmetric sinusoidal wave form to an asymmetric curved configuration in cross-section of the convex on the surface, or which has a configuration of continuous asymmetric trapezoids, or a saw-toothed or a diffraction grating, has been well known.

In the case of manufacturing the diffraction type optical element having such an asymmetric cross-sectional configuration, especially in using the stamper method among the conventional methods mentioned above, there are included steps which require a high accuracy in positioning and a relatively long work time, including for example a pattern transcription process and a baking process, and it is difficult to increase the processing accuracy of a master up to a certain level sufficient to be able to control the micro configuration.

On the other hand, in the case of using the coherent exposure method, since the thin film is made of an organic high polymer, it is inferior with respect to the characteristics of weather resistance and of heat resistance.

Further, in the case of implementing the reactive ion etching method, or the chemical etching method of dipping in a solution, there is included a process of lithography for producing a mask, in which process are included many processes, such as painting of the organic material, drying, exposure, baking, development, etc. And, for changing or modifying the cross-sectional configuration of the diffraction grating, for instance, for obtaining a diffraction grating having a step-like cross-section, it can be realized for the first time by repeating the exposure process and the etching process several times and by gradually changing the configuration of the mask, thereby requiring many steps.

SUMMARY OF THE INVENTION

According to the present invention, for resolving such drawbacks mentioned above, there is provided a method for manufacturing a diffraction type optical element having a plurality of convexities continuously formed on the surface thereof, said convexities having an asymmetric curved shape, an asymmetric trapezoid shape, or a saw-toothed shape, or a blaze in cross-sectional configuration thereof, wherein, when removing a surface of a substrate by evaporating or ablating the substrate depending on the intensity of a laser beam and in using a distributed intensity of an interference pattern caused by interference of a plurality of laser beams, the surface of the substrate is inclined with respect to a plane being perpendicular to an average light beam axis of the plural laser beams forming the interference pattern.

In the above, the average light beam axis means a line passing a crossing point, at which the plural laser beams intersect with each other, and a center of gravity of the following points, for an axis of each of the plural laser beams, which are positioned at the same distance from the points at which the plural laser beams intersect with each other (where the interference pattern is produced) in a direction of the laser beam source, respectively.

For example, when the number of laser beams is two (2), the axis of the average light beam is the bisector of an angle defined by the axes of the two (2) laser beams.

As the substrate, a glass substrate is conceivable, and in a case that a glass substrate is used as the substrate, it is preferable that the surface of the substrate to be processed previously contains silver in the form of Ag atoms, Ag colloid, or Ag ions. This is because the absorption efficiency can be increased thereby, thus easily causing the ablation.

Moreover, without processing the glass substrate directly, it is also possible to form a thin film being superior with respect to the laser beam absorption than said glass substrate, when irradiating the laser beam having a distributed intensity upon the thin film.

The thin film can comprise a single layer of an inorganic material at most or multi-layers of a dielectric. As the inorganic material, there can be used metal, metal oxide, metal nitride, metal carbide, semiconductor, glass made of $SiO_2$ at most, fluoride glass, chalcogenide glass, etc., and as the multi-layer of the dielectric, there can be used silicon oxide, titanium oxide, cerium oxide, germanium oxide, magnesium fluoride, tantalum oxide, etc.

Conventionally, it has been already well known that a laser beam having an intensity higher than a certain level has to be irradiated for causing the ablation. However, in the case that a thin film is formed on the surface of the substrate, if the energy of the laser beam reaching through the thin film to the substrate is greater than the energy (threshold) sufficient to cause the ablation on the substrate, not only the micro convex-concavities are formed on the surface of the thin film but also the substrate itself is processed, thereby affecting the accuracy of the optical diffraction element. Therefore, it is preferable to set a thickness or an absorption coefficient of the thin film to a certain value less than the threshold value where the intensity of the laser beam reaching through the thin film upon the surface of the glass substrate is enough to cause fusion, evaporation or ablation on the glass substrate.

As the laser beam source, there can be used an excimer laser including a KrF, Nd-YAG laser, a Ti:$Al_2O_3$ laser and a high harmonic thereof, or a dye laser, wherein the laser beam is absorbed in the form of one photon or multi-photon absorption.

DESCRIPTION OF THE PREFERRED EMBODIMENTS

Figure 1:
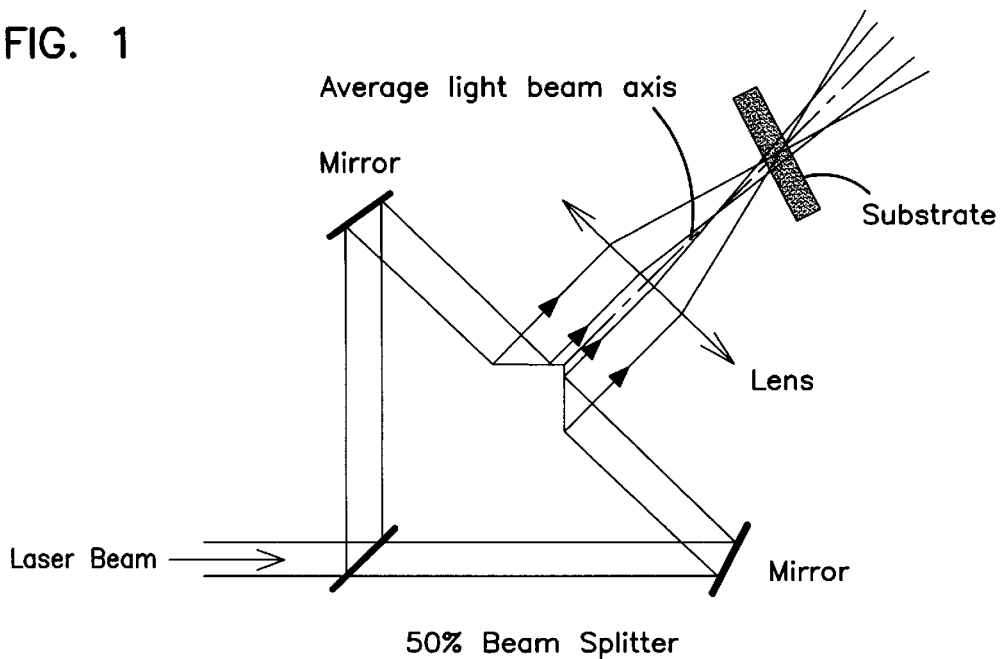
FIG. 1 shows a schematic diagram of an apparatus for manufacturing a diffraction grating by a method in accordance with the present invention using laser interference.

Hereinafter, a detailed explanation of the embodiments according to the present invention and comparisons will be given by referring to the attached drawings. Here, FIG. 1 shows a schematic diagram of an example of the apparatus for manufacturing a diffraction grating by the method in accordance with the present invention using laser interference, and FIG. 2 shows an enlarged view showing a positioning angle of a substrate.

Figure 2:
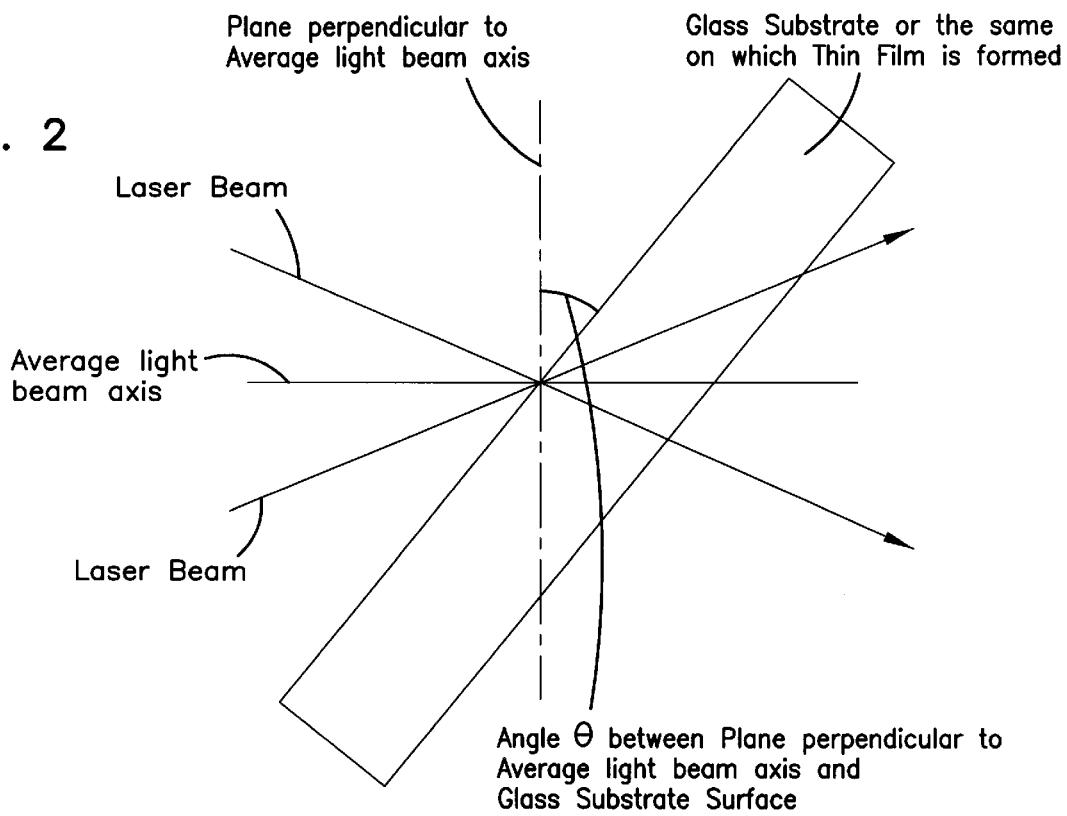
FIG. 2 is an enlarged view showing a positioning angle of the substrate.

In the apparatus for manufacturing the diffraction grating, one emitted laser beam of a single mode is divided into two (2), and these are focused on a glass thin film again (In fact, the focus position is shifted forward.), thereby forming and irradiating onto it a laser beam pattern which is periodically changing in intensity due to the interference between them With the positioning angle of the substrate, the substrate is positioned, as shown in FIG. 2, being inclined to a plane which is perpendicular to an average light beam axis of the two (2) laser beams forming an interference pattern.

However, for the manufacturing apparatus, other variations are also conceivable, such as those which are different from that shown with respect to the above drawings in the positions of the mirror and the beam splitter and so on.

As mentioned in the above, by making the substrate be inclined with respect to the plane perpendicular to the average light beam axis, a direction of removing from the substrate is inclined with respect to a surface of the substrate, therefore, a diffraction grating having an asymmetric cross-section can be obtained. In more detail, at an initial stage of processing, it has such an asymmetric trapezoid shape as shown in FIG. 3(*a*) in the cross-section, and, as the evaporation proceeds, it comes to be a saw-toothed shape as shown FIG. 3(*b*).

Figure 3:
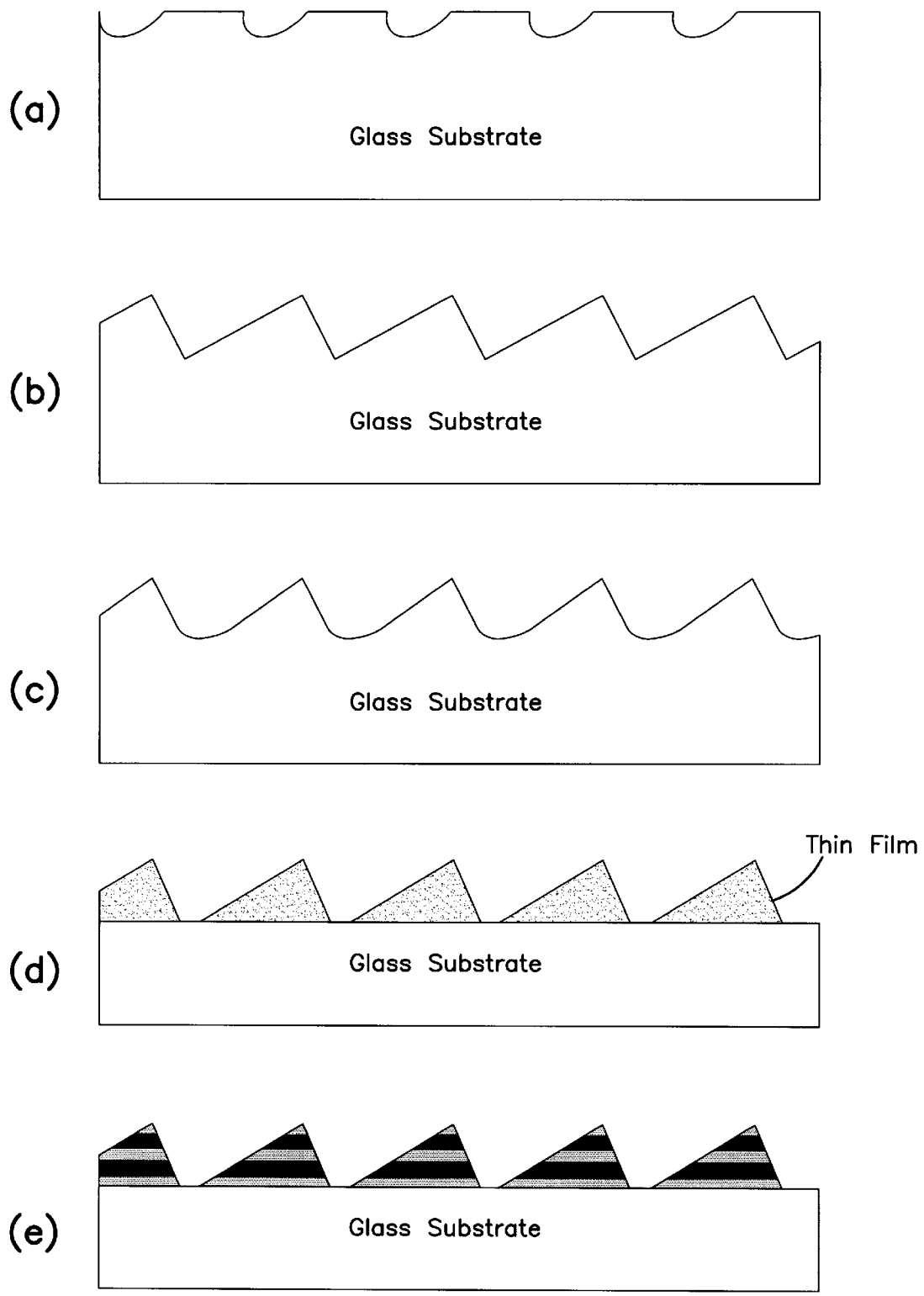
FIGS. 3(*a*) through (*e*) show various schematic cross-sectional views of the diffraction type optical elements obtained in accordance with the present invention.
Figure 4:
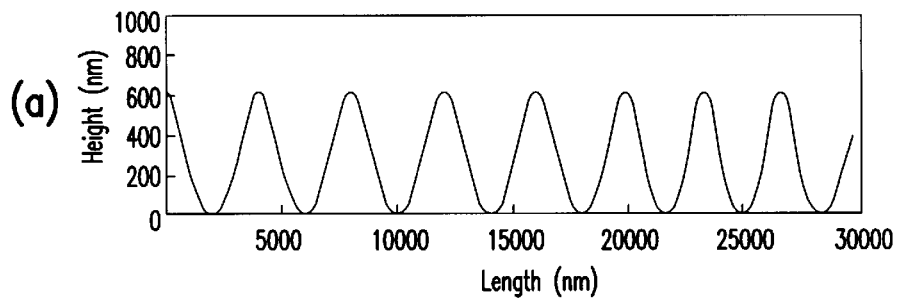
FIGS. 4(*a*) through (*d*) show various schematic cross-sectional views of the diffraction gratings which are processed by changing the inclination angle of the substrate.
Figure 4:
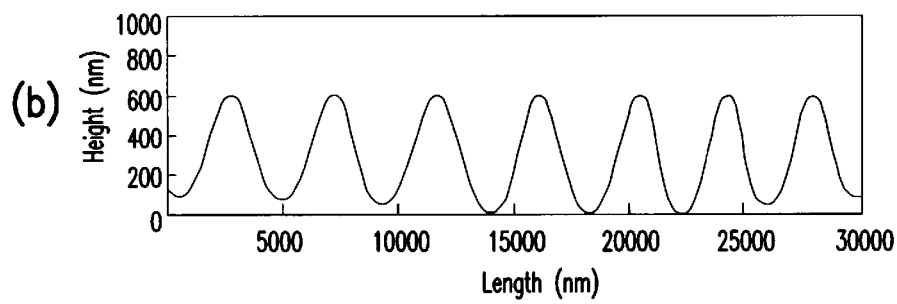
Figure 4:
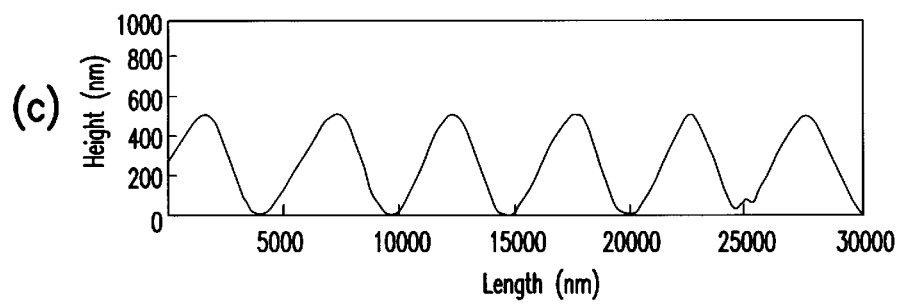
Figure 4:
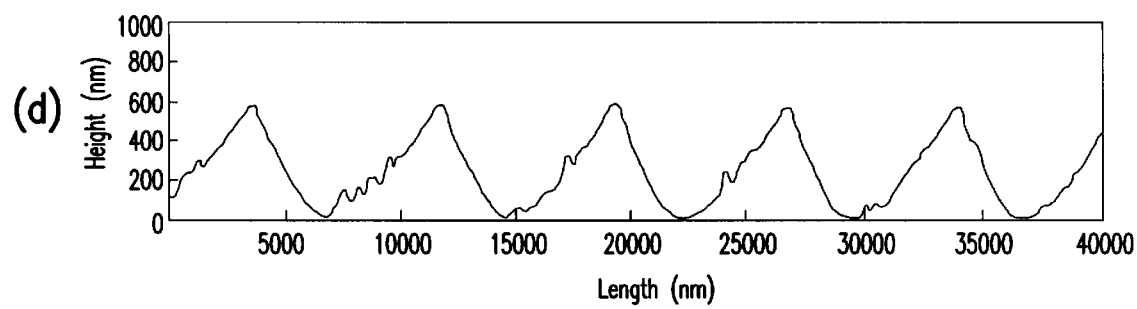
Figure 5:
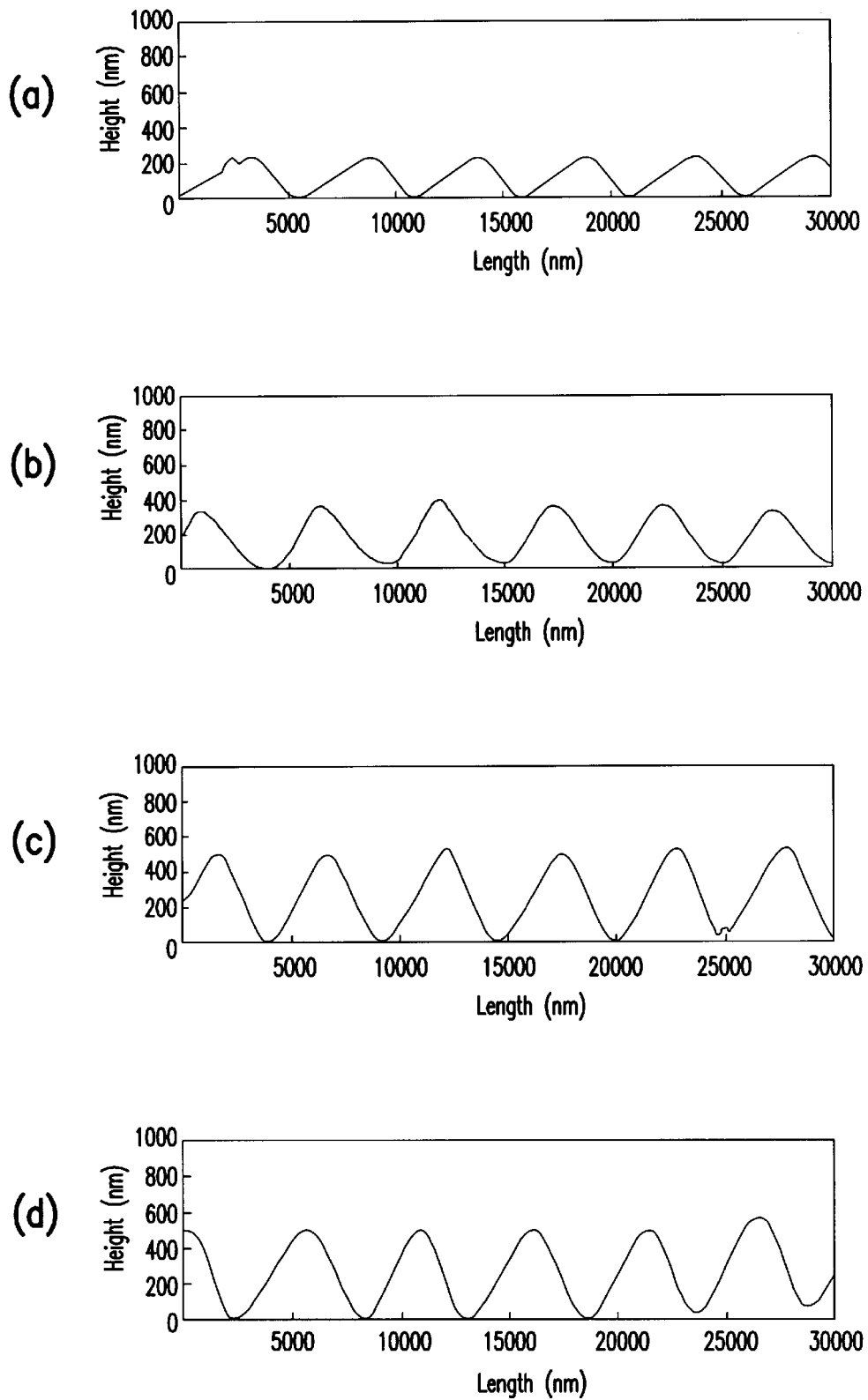
FIGS. 5(*a*) through (*d*) show various schematic cross-sectional views of the diffraction gratings when the shot number of the laser is changed to various values, while fixing the angle of the substrate.

Further, in the case that it has a concentration gradient which is gradually decreasing in the concentration of Ag from the surface, by further irradiating the laser beam following the above-mentioned process, since the content of Ag is decreased inside of the glass substrate as shown in FIG. 3(*c*), a threshold value for ablation (energy density of laser beam necessary for evaporating the glass substrate) increases, and the evaporation becomes difficult to cause. As a result of this, a diffraction grating having a curved concave portion can be obtained.

On the other hand, in the case that on the surface of the glass substrate there is formed a thin film which has superior characteristics with respect to absorption for laser light, since no ablation occurs on the substrate as long as the laser beam is irradiated at an energy not enough to cause the ablation (evaporation), a diffraction grating which has such an asymmetric triangle cross-sectional configuration as shown in FIG. 3(*d*) is formed.

Further, by forming a dielectric multi-layer as the thin film and irradiating the laser beam onto the dielectric multi-layer, such a photonic crystal as shown in FIG. 3(*e*) can be obtained, which can be used as a double refraction element or a light scattering body, etc.

Embodiment 1—an example of forming the diffraction grating directly on the glass substrate.

As the glass substrate to be processed, a glass plate is used, which is mostly made of $Al_2O_3$-$SiO_2$-$B_2O_3$-$Na_2O$-F and which has a thickness of 2 mm, and on which is processed an Ag ion exchange processing. The Ag ion exchange processing is carried out by the following steps. A mixture of silver nitrate and sodium nitrate mixed at 50 mol % —50 mol % is used as molten-salt for the Ag ion exchange, and the glass to be treated is dipped in a reactor vessel of quartz for 30 minutes. The temperature of the molten-salt is kept at 300° C. in an electric furnace, and the reaction occurs in air. By conducting this process, $Na^+$ ions on the surface of the glass are eluted and $Ag^+$ ions contained in the salt are diffused into the glass (namely, the so called "ion exchange" process occurs). By measuring the thickness of the layer 2 in which the Ag diffuses by an X-ray micro analyzer, it is found to be about 7 $\mu$m. The glass manufactured by this manner has good characteristics with respect to laser processing. Other than the glass used in this embodiment, various glasses containing Na as a component and processed by the Ag ion exchange, for example, a glass system of $SiO_2$-$B_2O_3$-$Na_2O$ which is processed by the Ag ion exchange, have good characteristics with respect to laser processing. Therefore, they can also be used as the substrate on which the processing method for a glass surface according to the present invention can be implemented.

As the laser beam source there is used a third (3) high harmonic (wavelength: 355 nm, pulse width: about 5 nsec, repetitive frequency: 5 Hz) of an Nd:YAG pulse laser. The energy per one pulse of the laser can be changed by changing a timing of a Q switch of the laser apparatus. In the case of the laser beam used in the present embodiment, the maximum pulse energy is about 350 mJ and the diameter of the laser beam is around 7 mm.

As shown in FIG. 1, this laser beam is divided into two (2) beams by a beam splitter, and they are so adjusted that they are overlapped again on the glass substrate after passing through respective light paths. For forming a clear interference pattern on the glass substrate, it is necessary that the light paths of the two (2) light beams be substantially equal to each other, and also that the energy of each of the beams be substantially equal to each other. In fact, the difference between the two (2) light beams is less than 2 cm in their paths, and this is sufficiently small compared to 150 cm, i.e., the special length of the pulse of the laser beam, thereby it is possible to form a clear interference pattern. In the case of the present embodiment, the energy ratio of the two (2) beams is about 1:2 due to differences in mirror loses in the respective light paths, however, the clearness of the interference pattern is not affected by such a small degree of difference in energy.

The evaporation or the ablation by the laser beam is generally a non-linear phenomenon, and the evaporation of material occurs first when there comes to be a greater than certain intensity. In the case of the glass substrate used in the present embodiment, with the light beam of wavelength 355 nm, the ablation does not occur until when the energy density comes to be more than 3 to 4 J/cm$^2$/pulse. Then, for increasing the energy density, the laser beam is focused on the glass substrate by a lens which has a focal length of 200 mm so as to obtain a beam size of 2 mm.

However, since the laser is radiated in the atmosphere in the present embodiment, a plasma occurs at the focus position of the lens due to discharging through the air. For removing the influence of the plasma, the position of the glass substrate is adjusted to be located nearer to the lens than the focus position of the lens. Accordingly, the two (2) light beams in front of the lens are depicted in parallel in FIG. 1 for the purpose of easier understanding, but they are actually incident upon the lens at a small angle By using the laser radiation system as mentioned above and positioning the glass surface in such a way that the irradiated surface of the glass substrate is inclined at an angle of 20°, 30°, 45°, or 60° respectively with respect to the plane perpendicular to the average light beam axis of the two (2) laser beams, the diffraction gratings having the cross-sections as shown in FIGS. 4(a) through (d) are formed by irradiating the laser beam on the glass substrate.

Further, the number of irradiations of the laser beam (pulse number) at the respective angles is ten (10) shots, and the diffraction grating has a cross-section similar to the saw-tooth shape at every angle.

Figure 7:
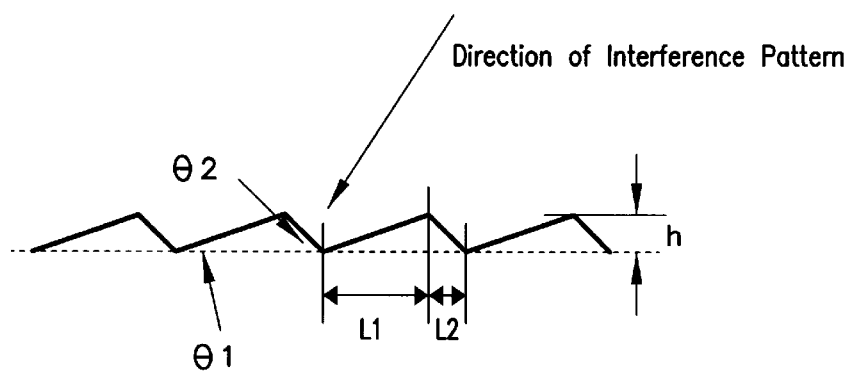
FIG. 7 is an explanatory drawing depicting the cross-sectional configuration accompanying a chart in the detailed description.

The frequency and asymmetry of respective diffraction gratings are shown in the following chart, by referring to an attached explanatory drawing in FIG. 7.

CHART
Configuration of Grating Manufactured by Interference Ablation with Inclined Irradiation

| Sample No. | Substrate Angle deg | Number of Shots | Pitch-Optical Microscope μm | Pitch-AFM μm | L1 μm | L2 μm | h μm | θ1 deg | θ2 deg | L1/(L1 + L2) |
|---|---|---|---|---|---|---|---|---|---|---|
| 1 | 110 | 10 | 3.2 | 3.94 | 2.03 | 1.91 | 0.62 | 17 | 18 | 0.52 |
| 2 | 120 | 10 | 3.5 | 4.34 | 2.30 | 2.04 | 0.58 | 14 | 16 | 0.53 |
| 3 | 135 | 10 | 4.4 | 5.31 | 2.98 | 2.33 | 0.52 | 10.1 | 12.7 | 0.56 |
| 4 | 150 | 10 | 6.5 | 7.51 | 4.66 | 2.85 | 0.55 | 6.75 | 11.03 | 0.62 |
| 5 | 135 | 4 | 4.5 | 5.43 | 2.51 | 2.92 | 0.34 | 7.73 | 6.66 | 0.46 |
| 6 | 135 | 20 | 4.5 | 5.17 | 2.91 | 2.26 | 0.49 | 9.88 | 12.33 | 0.56 |
| 8 | 135 | 2 | 4.5 | 5.48 | 3.24 | 2.24 | 0.23 | 4.06 | 5.93 | 0.59 |

In FIGS. 4(a) through (d), every one of the cross-sectional shapes becomes saw-tooth like. This is because the energy of the laser beam and the number of shots are sufficiently large. However, by making the energy of the laser beams smaller and the number of shots fewer, the cross-sectional shapes become different from those shown in FIGS. 4(a) through (d).

FIGS. 5(a) through (d) show the results of analysis of the cross-sectional shapes obtained when fixing the angle of the glass substrate at 45° and varying the shot number at 2 shots, 4 shots, 10 shots and 20 shots, respectively.

The cross-sectional shapes gradually change from the asymmetric trapezoid to the saw-tooth as shown in FIGS. 3(a) through (e). However, if the shot number is increased too much, the diffraction grating becomes unclear due to a vibration of the optic system and fluctuation in the position of the substrate and so on.

Figure 6:
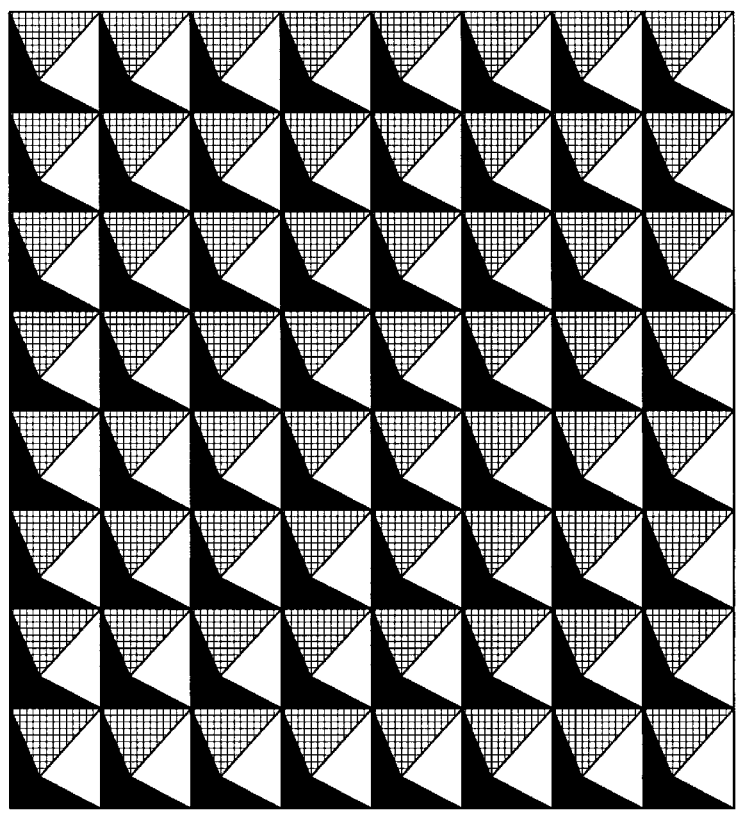
FIG. 6 shows a top plane view of the diffraction grating formed by the interference pattern among three (3) or more laser beams.

In the embodiments mentioned above, explanation is given only on the manner of using the interference pattern by two (2) laser beams. However, it is also possible to use an interference pattern formed by three (3) or more laser beams. In this case, the diffraction grating has a two (2) dimensional periodicity (inside of a plane). Namely, as shown in FIG. 6, there are formed inclined projections which have two (2) dimensions and are regularly aligned.

Embodiment 2—an example of the thin film on the glass substrate.

The second embodiment will be explained with respect to the case of using the same optic system as in embodiment 1 and forming a thin film, on which the diffraction grating is formed, with a material on the glass substrate.

The glass substrate (different from that used in the first embodiment), on which the thin glass film or layer containing silver is formed by a sputter method, is used as the material on which the laser beam is to be irradiated. The manufacturing method of the thin glass film on the glass substrate will be explained below.

On a soda-lime glass, there is formed a thin film of $SiO_2$ in which colloidal Ag is dispersed. As the method for forming, there is used the sputter method, in which $SiO_2$ and a chip of silver metal are positioned on the target and sputtered at the same time. The thin film is formed under the sputtering condition set out below. The target is positioned underneath, and a quartz target of dimensions 5 inches×20 inches is used as the target. On the target are separately positioned 32 of the plate-like chips of silver (having a diameter of about 4 mm).

Sputter Conditions:

Gas flow rate: Oxygen 3 sccm, Argon 97 sccm

Sputtering Pressure: $2.8 \times 10^{-3}$ Torr

Incident Electric Power: 3.0 kW

The thin film thus obtained, though it is brown colored, has a flat surface and strong adhesion, thereby a clear film is obtained. For 5 minutes of forming the film, there can be obtained a thin film having a thickness of 315 nm. Upon measuring the concentration of silver in the film by XPS (X-ray photoelectron spectroscopy), it is found to be 0.94 atom %. Upon measuring the absorption spectrum of the thin film, a peak of absorption is found to be in the vicinity of 390 nm. It can be thought that this is caused by plasmon absorption by amicrons or ultra fine particles of silver (colloid) and that the amicrons or ultra fine particles of silver are produced in the glass during the growing of the film.

By ablating only the thin film on the glass through the irradiation of the laser beam, and also by using the same interference optical system as in the first embodiment and changing the angle defined between the glass substrate and the interference pattern of the laser beam, there can be formed a diffraction grating which has the cross-sectional view as shown in FIG. 3(a).

Here, the ablation of the thin film is carried out after ascertaining that the laser beam does not evaporate the glass substrate by positioning only the substrate at the processing position. Accordingly, what is evaporated by the irradiation of the laser beam is only the thin film.

As a result of this, the cross-sectional view of the diffraction grating becomes, differing from that of embodiment 1, an asymmetric trapezoid or triangle.

As the source of the laser beams, there is used the same source as in embodiment 1.

In this way, it can be ascertained that the manufacturing method of the diffraction grating according to the present invention can be applied to the thin film formed on the glass.

In the above embodiments, though the same laser beam source is used, other laser-beam sources can be used in place thereof, for implementing the present invention. For example, with a second high harmonic of the Nd:YAG pulse laser (wavelength: 532 nm, pulse width: about 10 ns, repetitive frequency: 5 Hz), it is ascertained that substantially the same result is obtained. Further, an excimer laser such as ArF and KrF, an Nd-YAG laser, a $Ti:Al_2O_3$ laser and the high harmonics thereof, or a dye laser, which absorbs in the form of one photon or multi-photon absorption, are also applicable to the manufacturing of the diffraction grating according to the present invention.

In the above embodiments, the explanation is given only with respect to a glass substrate. However, the invention is not limited to this, and the manufacturing method of the diffraction grating according to the present invention is applicable to various other materials for the substrate, including metal and organic thin films. However, it is necessary that the amount of the evaporation or the ablation on the substrate occurring upon the irradiating of the laser beam be changed depending on the amount of the energy of the laser beam. Namely, if the amount of substrate removed does not change depending on the intensity of the laser beam, the manufacturing method of the diffraction grating according to the present invention cannot be applied to it.

As is explained above, according to the present invention, a diffraction type optical element can be obtained by an easy operation, in which an arbitrary shape of the cross-section can be formed directly on a substrate surface or on a thin film provided on the substrate.

Accordingly, the intensity of the light diffracted, for example with respect to a light beam at zero (0) degrees, becomes asymmetric. Namely, a diffraction grating can be easily obtained, which is effective for the use of selectively diffracting light in a certain direction and dividing it.

And, in the case of the substrate made of the glass material, silver is diffused on the surface to be processed, or a thin film is formed on the substrate surface, which has a superior laser beam absorption characteristic than the glass substrate, and then the laser beam having a distributed intensity is irradiated thereon. Thereby, the necessary portions can be easily removed by fusion, evaporation or ablation, by absorbing the energy of the laser beam into the portions having high silver concentration, or into the thin film.

Furthermore, a diffraction type optical element can be obtained which has superior characteristics with respect to accuracy of diffraction and to dividing the light beam, by making the thin film to be superior in laser absorption capability than the glass substrate when forming the thin film.

What is claimed is:

1. A method for manufacturing a diffraction type optical element having a plurality of convexities continuously formed on a surface thereof, said convexities having a shape from the group consisting of an asymmetric curved shape, an asymmetric trapezoid shape, a saw-toothed shape, and a blaze in cross-sectional configuration thereof, the method comprising:

forming an interference pattern by a plurality of laser beams;

inclining the surface of the substrate with respect to a plane perpendicular to an average light beam axis of the plurality of laser beams; and forming the convexities by removing part of the surface by evaporating or ablating the substrate depending on intensities of the laser beams, using a distributed intensity of the interference pattern.

2. A method for manufacturing a diffraction type optical element as defined in claim 1, wherein said substrate comprises a glass substrate, the method further comprising:

providing the surface with at least one from the group consisting of Ag atoms, Ag colloid, or Ag ions, wherein forming the convexities further comprises irradiating the plurality of laser beams onto a surface portion so as to cause fusion, evaporation or ablation on the surface portion by said surface portion absorbing energy from the plurality of laser beams, thereby removing said part of the surface.

3. A method for manufacturing a diffraction type optical element as defined in claim 1, wherein said substrate comprises a glass substrate, the method further comprising:

forming a thin film on said glass substrate, which film is superior in laser beam absorption with respect to said glass substrate, wherein forming the convexities further comprises irradiating the plurality of laser beams onto said thin film, so as to cause fusion, evaporation or ablation on said thin film by said thin film absorbing energy from the plurality of laser beams, thereby removing said part of the surface.

4. A method for manufacturing a diffraction type optical element as defined in claim 3, wherein said thin film is selected from the group consisting of a single layer of an inorganic material and a plurality of layers of a dielectric material.

5. A method for manufacturing a diffraction type optical element as defined in claim 3, wherein the thin film is formed with a thickness less than a threshold thickness where the plurality of laser beams reaching through the thin film to said glass substrate is sufficient to cause the fusion, evaporation or ablation on the glass substrate.

6. A method for manufacturing a diffraction type optical element as defined in claim 3, wherein the thin film is formed with an absorption coefficient less than a threshold absorption coefficient where the plurality of laser beams reaching through the thin film to said glass substrate is sufficient to cause the fusion, evaporation or ablation on the glass substrate.

* * * * *